UNITED STATES PATENT OFFICE.

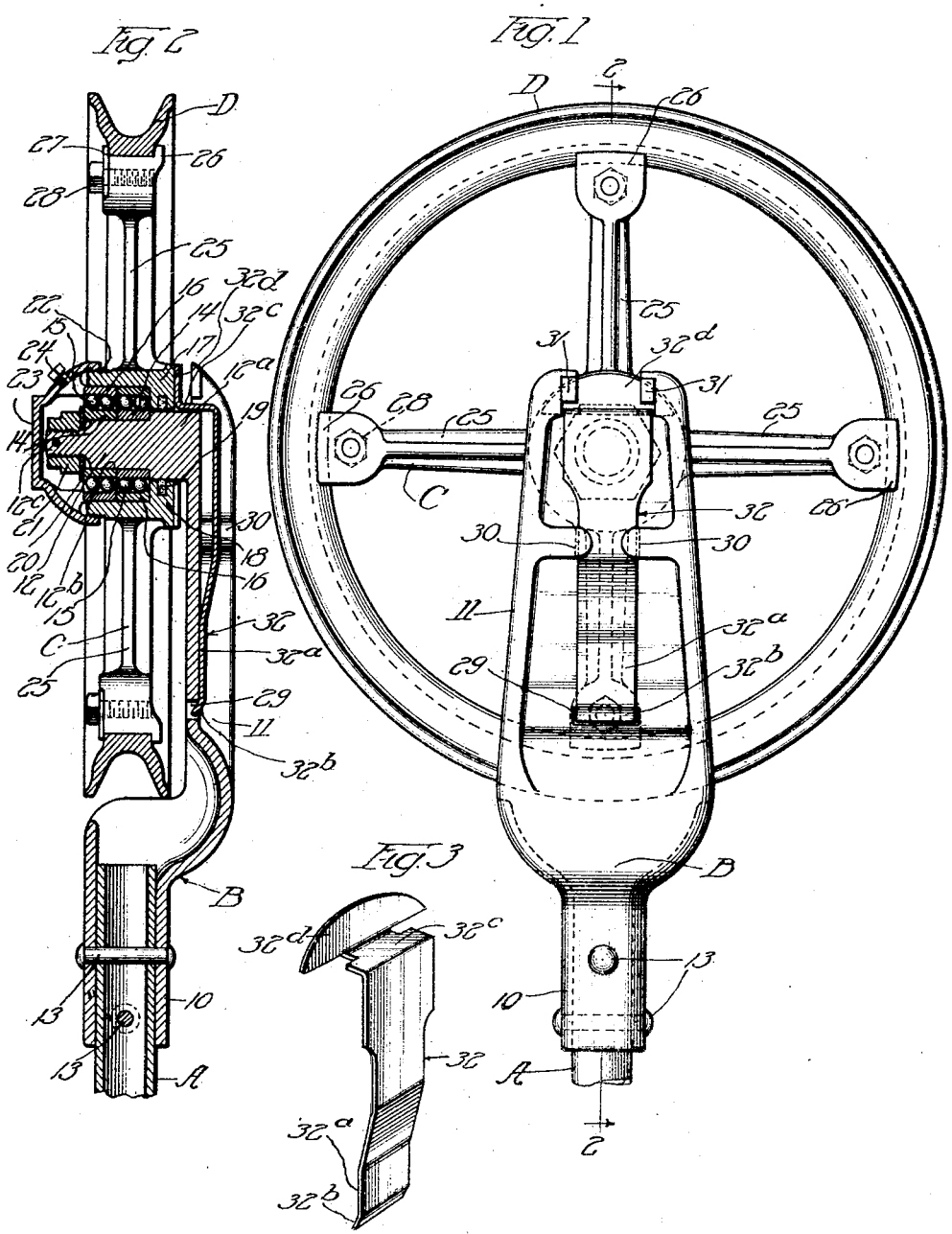

WILLIAM R. GILLIES, OF CHICAGO, ILLINOIS, ASSIGNOR TO L. LOUIS COHEN, OF CHICAGO, ILLINOIS.

TROLLEY WHEEL AND HARP.

1,366,378. Specification of Letters Patent. Patented Jan. 25, 1921.

Application filed November 20, 1919. Serial No. 339,507.

*To all whom it may concern:*

Be it known that I, WILLIAM R. GILLIES, a citizen of the United States, residing at Chicago, in the county of Cook and State of Illinois, have invented a certain new and useful Improvement in Trolley Wheels and Harps, of which the following is a full, clear, concise, and exact description, reference being had to the accompanying drawings, forming a part of this specification.

My invention relates to a trolley wheel and harp construction such as is employed in conjunction with the trolleys of electrical railway cars and the like, and briefly stated, my invention contemplates:

First: A trolley wheel and harp construction that is characterized by its simplicity and durability, and which can be manufactured at low cost.

Second: A construction of this class wherein the trolley wheel comprises a removable rim which readily may be removed and replaced whenever occasion requires.

Third: A construction of this class wherein the harp is so formed and arranged that the wheel rim may be removed and replaced as aforesaid without in any way disturbing the mounting of the spider or trolley wheel proper.

Fourth: A construction of this class which comprises a simplified form of anti-friction bearing for the trolley wheel and novel and efficient means for adequately lubricating the several parts of the bearing.

Fifth: A trolley wheel and harp construction comprising novel means for at all times maintaining perfect electrical connection between the harp and wheel, said means being in the form of a spring which is retained in position solely by its resiliency without the use of rivets, screws or the like, and which may be placed in operative position and removed therefrom without the use of special tools of any kind.

These and other features of my invention will appear as the following detailed description progresses.

In the accompanying drawings illustrating my invention,

Figure 1 is a side elevational view of a trolley wheel and harp embodying my invention;

Fig. 2 is a vertical sectional view taken on the line 2—2 of Fig. 1;

Fig. 3 is an isolated view in perspective of the improved contact spring which maintains perfect electrical connection between the harp and trolley wheel at all times.

Similar characters of reference refer to corresponding parts in the several figures. In the drawings, the trolley, trolley harp, trolley wheel proper and the removable rim are illustrated respectively at A, B, C and D. The harp B comprises an integral member, preferably of cast steel, which consists of the sleeve or socket 10, the upwardly extending arm or bracket 11 which lies to one side of the axis of sleeve 10, and the bearing pin 12 which projects laterally from bracket 11. The bearing pin 12 overlies the sleeve or socket 10 and is disposed with its axis at right angles to the said sleeve or socket 10. The harp sleeve or socket receives and is rigidly secured to the upper end of the trolley by any suitable means, as for instance a plurality of rivet pins 13—13.

The pivot pin 12 comprises three portions of different diameters; namely, the portion $12^a$ of greatest diameter, the portion $12^b$ and the reduced threaded end $12^c$. Carried on the intermediate portion $12^b$ are the inner ball races 14—14 with which coöperate bearing balls 15—15 and outer races 16—16. The spider or trolley wheel proper illustrated at C comprises the hub 17 within which are suitably mounted the outer ball races 16—16. The hub also preferably comprises the inwardly projecting annular flange 18 which is grooved to receive packing material 19 which lies snugly in engagement with the portion $12^a$ of the pin 12 and effectively prevents the escape of lubricating oil at this point. It will be noted that the flange 18 provides a flat annular face on that side thereof nearest the harp bracket 11.

The hub 17 and the bearing elements are retained in position upon the pin 12 by washer 20 and castle nut 21, the latter being pinned or otherwise locked against displacement.

The hub 17 is externally screw-threaded at 22 to coöperate with internal threads formed in a hub cap 23, as is clearly shown in Fig. 2. It will be noted that with the several parts assembled, as shown in Fig. 2, the pin 12, hub cap 23, hub 17 and packing material 19 afford a tight chamber capable of receiving a substantial quantity of lubricant for the bearing elements. The hub cap is conveniently provided with a single filling aperture which is preferably closed by a nut 24. This construction is of importance because experience has proven that this class of trolley wheels, due to the rather inaccessible places in which they are placed, are very seldom lubricated in practice; hence, it is essential that it be possible to supply the bearing elements with a substantial supply of lubricant at the time of installation, and this is doubly important in the case of my improved wheel wherein it is contemplated that the spider or wheel proper shall outlast a large number of rims that may be placed thereon from time to time.

Radiating from the hub 17 are the arms or spokes 25, each of which is slightly enlarged at its free end, and is provided with an outwardly projecting lip 26 on one side thereof. The extremities of these arms or spokes are struck on a circumference or circle having the wheel axis for its center, so that the rim D readily may be slipped in position over the ends of the spokes and against the several lips 26—26. The rim is preferably retained in position by locking plates 27—27, each of which is arranged to be clamped in position by a cap screw 28. Any suitable form of locking washer (not shown) or other equivalent means may be provided in connection with the cap screws 28. It will be noted that the inner surface of the rim D is perfectly smooth so that it may be placed and secured in any angular position with respect to the spokes 25—25.

The lower part of the harp bracket 11 is provided with a transverse slot 29. Intermediate the slot 29 and the upper end of bracket 11, the latter is provided with a pair of lugs 30—30 which face toward each other. At its upper end, the harp bracket 11 is provided with a second pair of lugs 31—31 which extend toward each other, but which are disposed with their adjacent ends a substantial distance apart. The slot 29 and the lugs 30—30 and 31—31 coöperate to retain the contact spring 32 in operative position without the necessity of providing rivets, screws or similar devices. The spring is formed from a single piece of flat metal, such as brass, and comprises a shank consisting of a flat portion $32^a$ which at its lower end is provided with a forwardly turned lip $32^b$. The shank is turned rearwardly from the straight portion $32^a$ and then extends upwardly for a substantial distance where it is turned forwardly at right angles to form the neck $32^c$ which consists of a portion of substantially the same width as the body of the shank, and a portion of lesser width than the body of the shank. It will be noted that the larger portion of the neck is of a width greater than the distance between the adjacent ends of the lugs 31—31, whereas the smaller portion of the neck is of a width somewhat less than the distance between the adjacent ends of the lugs 31—31. Formed upon the end of neck $32^c$ is a flat segmental head $32^d$, which is disposed in a plane substantially parallel with the shank.

After the harp and trolley wheel parts have been assembled, as shown in Fig. 2, the shank portion of spring 32 is slipped down between the body portion of the bracket and the spaced lugs 30—30. The upper end of the shank is then sprung rearwardly and the narrow portion of the neck $32^c$ is permitted to slip down between lugs 31—31 until the lip $32^b$ engages in slot 29. Upon the release of the upper end of the spring, the resiliency of the metal causes the head $32^d$ to firmly press against the adjacent annular surface of the wheel hub. With the head $32^d$ pressing against the wheel hub the wide portion of the neck $32^c$ lies under the lugs 31—31 and thus the spring is securely held against accidental displacement. It will be noted that the spring head comprises a substantial area in contact with the wheel hub and that the spring shank has a substantial area in contact with the bracket, thus insuring a good electrical connection between the wheel and bracket. When the contact spring is to be removed for any reason, it is only necessary to spring the upper portion outwardly or away from the wheel until the narrow portion of the spring neck lies under lugs 31—31. The spring may then be drawn upwardly and away from the harp bracket.

In some cases it is desirable to form the detachable rim D of suitable steel, say for instance, manganese steel, the inner surface of the manganese rim being lightly copper plated for contact with the outer ends of the spokes of spider C. In this case the outer ends of the spokes are correspondingly copper plated. This construction is desirable since manganese steel is very hard and substantially non-corrosive and may be given a very smooth surface at the point where it engages the trolley wire. Some difficulty has been experienced with bronze rims because of the fact that the same are subject to pitting and tend to wear the trolley wire.

Having thus described my invention, what I claim as new and desire to secure by United States Letters Patent, is:

1. In a construction of the class described, a harp bracket provided at its lower end with means for attaching it to a trolley, a bearing pin formed integral with said bracket and projecting laterally therefrom, a wheel spider rotatably mounted on said pin, said spider consisting of a hub having a plurality of arms radiating therefrom, said arms having outer end surfaces all struck on the circumference of a circle having the spider hub axis as its center, a one-piece annular rim having a continuous inner surface arranged to lie around the ends of said arms, an outwardly projecting lip formed on the outer end of each of said arms, and clamping means carried by each of said arms for securing said rim in position against said lips.

2. In a construction of the class described, a harp bracket provided at its lower end with means for attaching it to a trolley, a bearing pin formed integral with said bracket and projecting laterally therefrom, a wheel spider rotatably mounted on said pin, said spider consisting of a hub having a plurality of arms radiating therefrom, a one-piece externally grooved rim arranged to fit around said arms and to lie in any angular position with respect to said arms, together with clamps at the outer ends of the spider arms for retaining said rim in operative position upon said spider.

3. A construction of the class described comprising a bracket provided at its lower end with means for attaching the same to a trolley, a pin formed integral with the upper end of said bracket and projecting laterally therefrom, an inner ball race carried by said pin, a coöperating outer ball race, a wheel spider comprising a hub in which said last mentioned race is mounted, bearing balls coöperating with said races, arms radiating from said hub, a removable rim disposed around and in engagement with said arms, said hub provided on that side thereof nearest the bracket with an annular lip lying around said pin and carrying packing material snugly fitting said pin, together with a cap fitted upon the other end of said hub, said hub, cap, pin and packing material constituting a closed chamber adapted to receive and hold a substantial quantity of lubricant.

4. A construction of the class described comprising a harp bracket provided at its lower end with means for attaching the same to a trolley, a pin formed integral with the upper end of said bracket and projecting laterally therefrom, a wheel spider comprising a hub and a plurality of integral arms radiating from said hub, said hub being fitted around said pin, anti-friction bearing devices interposed between the pin and the hub, a removable rim disposed around the outer ends of said arms, said hub being provided on that end thereof nearest the bracket with an inwardly projecting lip carrying packing material snugly fitting said pin, and a hub cap fitted upon the other end of said hub, said hub, hub cap, pin and packing material constituting a closed chamber adapted to receive and hold a substantial quantity of lubricant.

5. A construction of the class described comprising a harp bracket provided at its lower end with a socket arranged to receive the upper end of a trolley, said bracket comprising an upwardly extending portion off set from said socket, a pin formed integral with the upper portion of said bracket overhanging said socket, a wheel spider, said spider comprising a hub and a plurality of integral arms radiating therefrom, said hub rotatably mounted on said pin, a one-piece externally grooved rim fitted around the outer ends of said arms, and devices for detachably securing said rim to said arms.

6. A construction of the class described comprising a trolley harp bracket provided at its upper end with a bearing pin extending laterally therefrom, a trolley wheel mounted on said pin, said wheel comprising a hub having a flat annular surface facing said bracket, a slot formed in said bracket near the lower end thereof, a pair of spaced overhanging lugs carried at the upper end of said bracket, and a spring comprising a shank portion provided at its lower end with a lip arranged to engage in said slot, said spring comprising a neck portion turned from said shank portion at substantially right angles thereto, and a flat head of substantial area turned from said neck and lying in a plane substantially parallel with said shank, said neck comprising portions of different width, that portion of the neck adjacent the shank being of a width greater than the distance between said overhanging lugs, that portion of the neck adjacent the head being of less width than the distance between said overhanging lugs, together with means spaced from the body portion of said bracket arranged to serve as an abutment for an intermediate portion of said shank.

7. A harp bracket carrying a pivot pin at one end thereof, a wheel mounted on said pin, an integral contact member of flat spring metal comprising a head portion bearing against the wheel hub, a shank portion off set from and substantially parallel to the head portion bearing against the bracket, a neck connecting the head and shank, said neck comprising two portions of different width, spaced lugs carried by said bracket overhanging said neck, and means carried by the bracket and spaced from the body portion thereof arranged to constitute an abutment for an intermediate portion of said shank.

8. A harp bracket carrying a pivot pin at one end thereof, a wheel mounted on said pin, an integral contact member of flat spring metal comprising a head portion bearing against the wheel hub, a shank portion off set from and substantially parallel to the head portion bearing against the bracket, a neck connecting the head and shank, said neck comprising two portions of different width, spaced lugs carried by said bracket overhanging said neck, and means carried by the bracket and spaced from the body portion thereof arranged to constitute an abutment for an intermediate portion of said shank, together with a slot in said bracket, and a lip in the lower end of said shank arranged to engage in said slot.

In witness whereof, I hereunto subscribe my name this 8th day of November, 1919.

WILLIAM R. GILLIES.

Witnesses:
ANDREW WINTERCORN,
EDNA V. GUSTAFSON.